United States Patent [19]

Boles

[11] Patent Number: 5,439,497
[45] Date of Patent: Aug. 8, 1995

[54] UTILIZATION OF LOW-QUALITY AMMONIUM SULFATES

[75] Inventor: Jeffrey L. Boles, Tuscumbia, Ala.

[73] Assignee: Tennessee Valley Authority, Muscle Shoals, Ala.

[21] Appl. No.: 280,640

[22] Filed: Jul. 25, 1994

[51] Int. Cl.$^6$ ............................ C05D 9/00; C05G 5/00
[52] U.S. Cl. ....................................... 71/63; 71/64.08; 71/64.13
[58] Field of Search ...................... 71/63, 64.08, 64.13

[56] References Cited

U.S. PATENT DOCUMENTS

| | | | |
|---|---|---|---|
| 4,589,904 | 5/1986 | Harrison et al. | 71/63 |
| 4,762,546 | 8/1988 | Boles | 71/30 |
| 5,135,561 | 8/1992 | Boles | 71/63 |

*Primary Examiner*—Wayne Langel
*Attorney, Agent, or Firm*—Robert A. Petrusek

[57] ABSTRACT

The present invention relates to techniques for successful storage, handling, shipment, and utilization of an inexpensive, poor-quality form of by-product ammonium sulfate (AS). Such AS undergoes rapid and severe caking almost immediately after production because the crystals are too small and often contain excessive moisture. Such rapid and severe caking renders the AS nearly impossible to move or use "as is" without expensive crushing and screening of the material. Accordingly, such poor-quality AS is often used in production of solution or suspension fertilizers. In the present invention, long-storing, non-caking, highly-flowable AS fines are produced by practicing an unconventional technique of mixing the attapulgite gelling clays normally used in production of such suspensions directly with the fresh, poor-quality, caking-type ammonium sulfate fines and storing the resulting improved AS fines dry until needed for production of suspensions or other uses. Thus, the instant invention minimizes raw material and storage costs by utilizing the attapulgite gelling clays for the dual purpose of imparting to the AS fines anticaking properties and built in gelling properties for later suspension use and maximizing the quantity of AS which can be stored in inexpensive solids storage equipment.

8 Claims, 1 Drawing Sheet

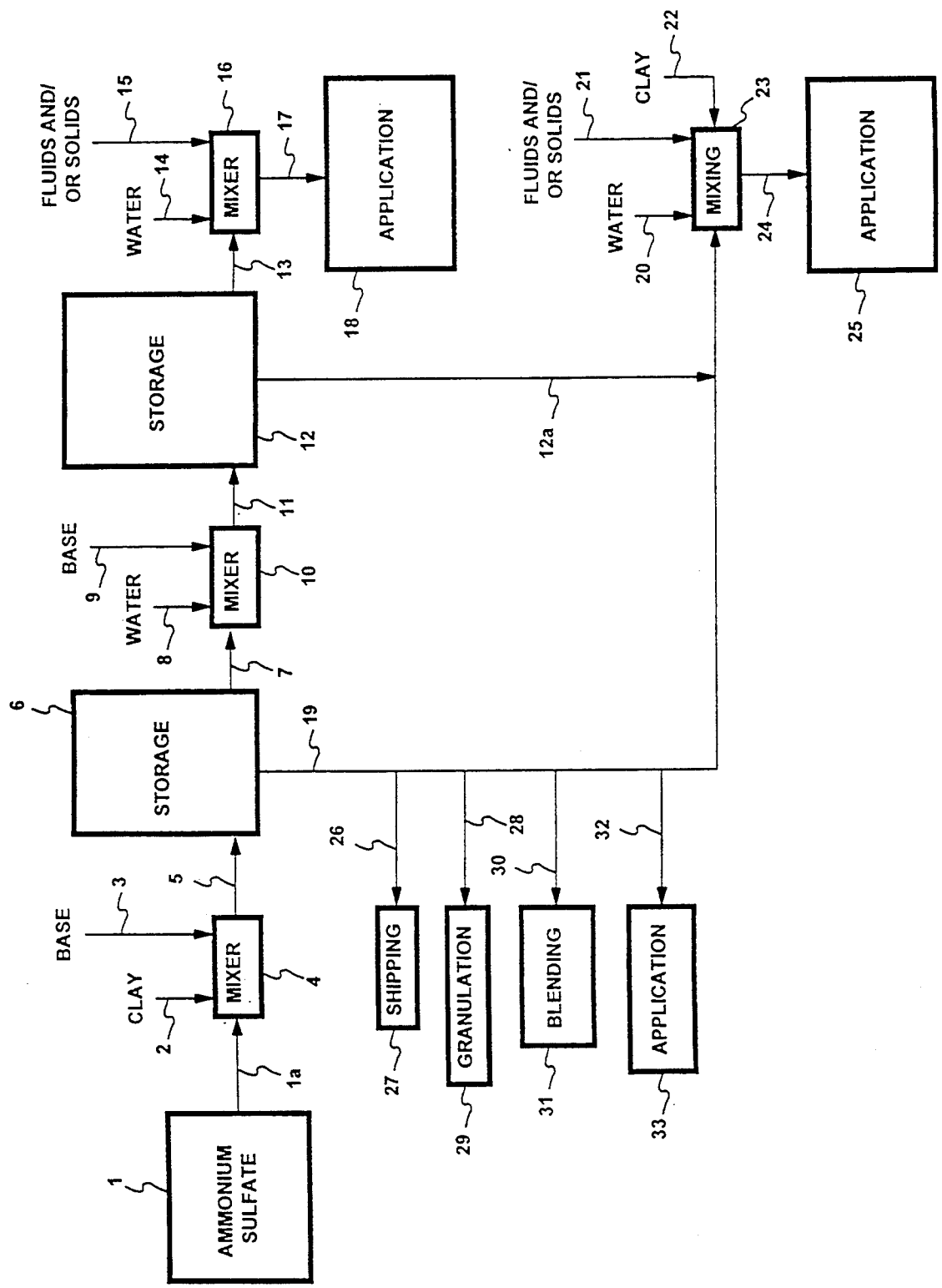

UTILIZATION OF LOW-QUALITY AMMONIUM SULFATES

The invention herein described may be manufactured and used by or for the government for governmental purposes without the payment me of any royalty therefor.

INTRODUCTION

The present invention relates to dramatic improvements in techniques for successful storage, handling/shipment, and utilization of a very inexpensive, low quality form of fine-crystal, by-product ammonium sulfate (AS) which normally has very poor storage, handling, and use properties. Such AS undergoes rapid and severe caking almost immediately after production because the crystals thereof, as produced, are too small. Often, such fine-crystal AS, referred to in the industry as "fines", contains considerable moisture, which further promotes caking in AS fines. Such rapid and severe caking renders AS fines unsuitable for use "as is" as a solid fertilizer itself or in production of other solid fertilizers, because metering, feeding, conveying, transfer and other handling operations with such caked AS is extremely difficult or impossible without expensive crushing and screening of the material. Furthermore, such AS fines are unsuitable for most solid fertilizer uses because they are improperly matched in size with other commonly used solid fertilizers. Accordingly, such poor-quality AS fines are often used in and are well suited to production of fluid fertilizers; with fertilizer solutions, the crystals are dissolved, so crystal size is not a consideration. In fertilizer suspensions, small crystal size is necessary to prevent problems with settling of the crystals or clogging of application equipment.

More particularly, the present invention relates to novel techniques for conversion of low-quality, caking-type AS fines into an improved, high-quality, long-storing, non-caking, highly-flowable dry form of AS fines prior to production of said suspensions, whereby the quantity of said by-product ammonium sulfate which can be stored in relatively inexpensive solids storage facilities is maximized and the time for which said by-product ammonium sulfate crystals can be stored in said inexpensive solids storage facilities is also maximized.

Still more particularly, the present invention relates to novel techniques for conversion of low-quality, caking-type, by-product AS fines into an improved, high-quality, long-storing, non-caking, highly-flowable dry form of AS fines prior to production of said suspensions, whereby the raw material costs for obtaining said non-caking and highly flowable characteristics are eliminated or minimized by adding the attapulgite gelling clay normally added during production of said suspensions instead to the said by-product AS fines prior to production of said suspensions.

Still more particularly, the present invention relates to improvements in such recent prior art methods of production of low-cost fluid sulfur sources which in turn result from conversion of such low-quality AS. As a result, the product resulting from the practice of the instant invention costs as little as one-third or less of other conventionally used fluid fertilizer sulfur sources such as ammonium thiosulfate solution.

Even still more particularly, the present invention relates to new and novel techniques for the successful and simple conversion of low-quality, caking-type, by-product AS fines into an improved, high-quality, long-storing, non-caking, highly-flowable dry form of AS fines prior to production of said suspensions, which new techniques at least substantially eliminate the need shown in the prior art for providing the large, elaborate, and costly crystallizer systems which are normally required for production of AS crystals large enough for satisfactory storage and use "as is" as a solid fertilizer or in production of other solid fertilizers, which new techniques also maximize low-cost dry storage of AS and minimize or eliminate higher cost fluids storage of the AS suspension intermediate produced by the more recently developed prior art shown in Boles ('561, infra).

BACKGROUND OF THE INVENTION

1. Field of the Invention

Ammonium sulfate is an important nitrogen-sulfur fertilizer in the United States and world agriculture. It is produced as a by-product of coke or caprolactam production as well as by ammoniation of spent sulfuric acid. By-product ammonium sulfate supply in the United States has remained relatively constant over the past several years at approximately 2 million tons per year. The utilization of ammonium sulfate as a fertilizer is oftentimes advantageous since it contains both nitrogen and sulfur in readily available forms and it is strongly acid forming, a benefit when applied to alkaline soils. Furthermore, it is a source of ammoniacal nitrogen not vulnerable to denitrification and it also is a biuret-free nitrogen source eminently useful for citrus fertilization. These advantages, as well as others, have caused ammonium sulfate to be viewed as an economical nitrogen and sulfur source compared to substitute products. Furthermore, alternate sources of fertilizer sulfur such as commonly used ammonium thiosulfate (ATS) solution and elemental sulfur (ES) are much more costly than the low-quality, small-crystal variety of by-product ammonium sulfate. Substitution of this low-quality, small-crystal form of ammonium sulfate for ATS solution or ES could provide truly remarkable savings and increased profits to fertilizer dealers by greatly reducing their raw material costs for both fertilizer sulfur and nitrogen. In the majority of cases the savings range from $75 to over $100 for each ton of ATS solution and over $200 for each ton of ES replaced with the low-quality, small crystal variety of AS. This would represent a very large savings in the fertilizer industry, where only a few dollars per ton is considered a substantial difference in price.

However, much of the by-product AS on the market today is most unsatisfactory for storage or use because the by-product AS crystals are too small and often contain too much moisture. To be satisfactory for storage and use, AS must ordinarily be produced and shipped in the form of large, relatively dry crystals or granules. Small AS crystals pack and cake severely during shipping and storage, making the material quite difficult or impossible to handle, mix, or apply as a solid. Incidences of entire storage bins of this low-quality AS rapidly becoming solidified or essentially one solid piece have been reported, precluding use of the material as well as removal of the material to make room for other fertilizer materials. Use of dynamite to break up the solidified material has been reported. These small, often wet AS crystals have been observed to essentially fuse together into an almost ceramic state. If the material can be broken up, it must be carefully screened to remove large lumps which remain and complicate blending and application of the material. The larger AS crystals or granules are considered more suitable for bulk blending and application because they are more closely matched in size with other fertilizer solids normally used in bulk blending and application in solid form; the small crystals are unsuitable for this purpose because segregation and uneven application occurs with fertilizer mixtures containing widely varying particle sizes (see Hoffmeister, George. "Quality Control in a Bulk Blending Plant," Proc. TVA Fertilizer Bulk Blending Conference, Louisville, Ky., Aug. 1–2, 1973). However, the large crystal and granular forms of AS are considerably more expensive (2 to 8 times as much depending on location) than the low-quality, small-crystal variety, because processing costs are considerably higher for granulating the AS or for producing large AS crystals and because the larger-sized varieties simply bring higher prices on the market because of the demand for their higher quality. Granulation of ammonium sulfate is a complex and expensive operation which requires large production rates to be profitable. Also, production of large AS crystals requires complex and expensive crystallizer systems with long crystallizer retention times as well as costly centrifuging and drying operations (see "Ammonium Salts, Nitric Acid, and Nitrates," *Fertilizer Manual,* International Fertilizer Development Center, Reference Manual IFDC-R-1, Published December 1979, Chapter VIII, pages 83–85). On the other hand, the small and often wet crystal varieties of AS such as the by-product of coke production or the AS fines portion of other AS production operations, are considerably less expensive than the granular or large crystal varieties, mainly because of the low demand on the market for AS with such poor properties. In addition, these small-crystal, low-quality forms of AS are the products of simple and relatively crude crystallization systems employed in low production rate applications or in other situations where the more elaborate and expensive processing systems required for production of granules or large crystals are either unaffordable or otherwise not practical or desirable. For example, in production of coke, which is used as a carbon source in steel production, coal is heated in ovens, resulting in formation of the coke and a coke gas containing ammonia. The ammonia in the coke gas must be removed early in the process for corrosion considerations. The ammonia is removed by scrubbing the coke gas with sulfuric acid and the effluent from the scrubber is ammonium sulfate slurry. This ammonium sulfate slurry is then concentrated with respect to the solids content and then simply sent to a centrifuge or other equipment to remove the ammonium sulfate liquor from the ammonium sulfate crystals. Of course, the slurry, if not treated, will quickly deposit the solids content thereof onto the bottom of storage vessels thereby rendering same totally useless. Thus, the AS slurry must be subjected to crystal removal operations shortly after it is produced. Obviously, it cannot be shipped or stored as made. The crystals exit the centrifuge small and wet and are often sent to storage in this condition without a drying step, exhibiting all of the aforementioned problems with these types of crystals. Drying the ammonium sulfate crystals improves short-term storage of the small crystals for a few days, but the drying step is expensive, and even the dried fine-crystal AS is still quite unsatisfactory for use in the solid fertilizer industry because it is not well matched in size with other fertilizer solids and still tends to pack and cake. Larger ammonium sulfate producers such as in the caprolactam industry have expensive, elaborate, and large crystallizers and use same with long retention times in an effort to produce large crystals. They also have to use rather expensive centrifuges, and expensive dryers in an effort to improve product storage properties (see Reference Manual IFDC-R-1). These types of operations result in formation of larger, drier crystals with improved storage properties but at greater cost for production; however, even these larger, drier crystals are often too small to be used satisfactorily in production of solid fertilizer blends.

Although these small-crystal, low-quality, inexpensive forms of AS are quite unsuitable for storage, shipping, use, and application as a solid, it has now been discovered that they are ideal for production and application in suspension form. More succinctly, such ammonium sulfate, which is the lowest quality as a solid fertilizer, is of the highest quality when in suspension form, because the production and very existence of a plethora of such small crystals result in suspensions having superior storage, handling, use, and application properties. Since the AS provides a very inexpensive raw material feedstream, production of such AS suspensions proves to be considerably more economical than other commonly available fluid fertilizer sulfur sources, such as ATS solution and ES suspensions, supra. It has recently been found that production of AS suspensions from these low-quality, small-crystal varieties of AS provides a successful and stable means for storage thereof, thereby providing the fertilizer dealer with a good, inexpensive fluid sulfur source immediately ready, when needed during the peak fertilizer rush season, without the complications and time lost in having to first break up and then screen solid AS and/or dissolve same in aqueous media.

Heretofore, the only technically and economically viable solution to the many problems supra, which are normally associated with storage and handling of low-quality by-product ammonium sulfate fines has comprised the conversion of the by-product AS, immediately after its manufacture, into a suspension intermediate and the subsequent storage of the resulting suspension intermediate for later use, wherein the suspension intermediate provides the means for successful storage of the low-quality by-product fines. Although AS property improvement via production of the suspension intermediate supra, was a dramatically better alternative than previously practiced methods of the prior art which had to deal and cope with the severe caking problems with the AS fines in solid form, successful production of the AS suspension intermediate required that the by-product AS fines had first to be converted to suspensions immediately or at least very soon after the AS fines were produced and before they had a chance to cake or pack during subsequent storage or shipment, lest any caked AS fines have to undergo expensive and time consuming crushing or delumping steps to allow feeding of the material into mixing equipment for production of the suspension intermediates. In many cases, and as noted supra, dealers prefer to buy the by-product AS fines in the off season when fertilizer application activity is low, demand for the by-product AS fines is low, and prices for the by-product AS fines are low. During such times, the inventory of low-quality AS fines at by-product producers is high and the material is generally in its poorest condition, being severely caked because it has been stored for some time. On the other hand, if the AS fines are purchased shortly after production during periods of high fertilization activity, the material is generally in better condition for easier production of suspension intermediates but supplies can be limited and prices are generally higher because there is more demand for the by-product AS fines. Thus, it may be appreciated that the requirement that the AS fines not be caked or not contain lumps introduces a severe logistics limitation to this most recently developed prior art alternative method for improving the properties of low-quality by-product AS fines.

Fortunately, it has now been discovered that the problems of fluid storage as such suspension intermediates can be substantially eliminated by utilizing the attapulgite gelling clay which will eventually be used to create such suspensions as a new and unique anticaking agent in fines whereby same can be stored for long periods of time in open-sided storage sheds without the resulting material caking or clumping to any appreciable degree.

2. Description of the Prior Art

The prior art to date reveals that there are available a number of methods and means which teach the production, in one way or another, of nitrogen-sulfur fluid fertilizers using ammonium sulfate and/or sulfuric acid and ammonia. Some of these prior-art teachings are represented by the investigations, teachings, and disclosures set forth in the following patents: U.S. Pat. No. 4,762,546, Boles, Aug. 9, 1988 (assigned to the assignee of the present invention); U.S. Pat. No. 5,135,561, Boles, Aug. 4, 1992 (assigned to the assignee of the present invention); U.S. Def. Pub. No. T101,803, Jones et al., May 4, 1982 (assigned to the assignee of the present invention); U.S. Pat. No. 4,116,664, Jones, Sep. 26, 1978; Canadian Patent No. 811,080, Ramaradhya, Apr. 22, 1969; U.S. Pat. No. 4,388,101, Lowder, Jun. 14, 1983; and U.S. Pat. No. 4,239,522, Wilson et al., Dec. 16, 1980. Procedures for producing fluid fertilizers containing both nitrogen and sulfur have been developed, since fluid fertilizers containing sulfur are now needed in many regions of the country for soils which are sulfur deficient. One particular procedure for production of a liquid fertilizer containing both nitrogen and sulfur (as in Jones '664, supra) involves reaction of urea with sulfuric acid to form a liquid nitrogen-sulfate fertilizer comprising urea-sulfate and liquefied urea. Sulfuric acid is added gradually to urea, which urea is preferably in powdered or prilled form, and added in controlled amounts to hold the temperature of the resulting reaction within prescribed limits. The combination of sulfuric acid and urea form a resulting reacting molten slurry which is blended slowly during the reaction period. Sulfuric acid is gradually added until the total desired amount thereof has been added, and blending is continued until the slurry becomes completely liquefied. Water is subsequently added to produce desired products which will remain in liquid form at normal ambient temperatures. From the practice of this procedure, a resulting product of grade 31-0-0-9.7S will begin to solidify at a temperature of about 60° F. If this product is diluted with water to a grade of 29-0-0-9S, the then resulting product will begin to solidify at about 10° F. The pH of these products ranges from 0.4 to 1.0.

The practice of another prior-art teaching reportedly also yields nitrogen-sulfur suspensions (as in Ramaradhya 811,080, supra). This procedure involves pregelling clay in urea-ammonium nitrate solution (32% N) and incorporating finely divided elemental sulfur in the solution-clay mixture by mixing in a tank with a propeller-type mixer. The grade of the resulting suspension is approximately 24-0-0-23S, and it is reported that the stability of the product is adequate for short-term storage.

Still another method for producing a nitrogen-sulfur suspension taught by Jones, et al. ('803, supra), involves the reaction of sulfuric acid with gaseous ammonia and the simultaneous addition thereto of a urea-water solution in a single-stage reactor to produce a resulting boiling urea-ammonium sulfate solution. The boiling solutions are then rapidly cooled in two stages to about 100° F. to produce therein an abundance of small urea crystals. The finished product is of grade 29-0-0-5S and contains mostly urea as the solid phase. Because of urea's high solubility and highly temperature-dependent solubility, urea crystals, as is generally well known, are subject to rapid growth to large sizes during storage.

In still another reported procedure, Lowder ('101, supra) teaches the production of nitrogen-sulfur solutions by first mixing sulfuric acid in water, followed by dissolving urea into the resulting acid solution, and finally by adding thereto anhydrous ammonia. However, because the products are solutions, in which the highest grades were limited by solubility, they are low in grade (19 to 25% nitrogen and 3 to 6% sulfur) and have rather high crystallization temperatures (32° to 40° F.) below which the products cannot be stored, because the large crystals which form settle to the bottom of storage tanks or plug up solution application equipment. Also, the low concentrations of these solutions substantially increase shipping and storage costs per unit of plant food as well as severely limit the degree of flexibility in formulating desired grades and compositions of fluid fertilizer normally expected in the fluid fertilizer industry with other sulfur sources.

In yet another procedure taught in the prior art, Wilson, et al. ('522, supra), produce nitrogen-sulfur solutions containing urea, ammonium nitrate, and ammonium sulfate. Because these products are solutions, the grades are low relative to suspensions and, because of ammonium sulfate's low solubility in UAN-32 (a urea-ammonium nitrate solution containing 32% nitrogen), the sulfur contents of these products are relatively low unless the nitrogen content thereof is drastically reduced. Here again, the low concentrations of these solutions substantially increase shipping and storage costs per unit of plant food as well as severely limit the degree of flexibility in formulating desired grades and compositions of fluid fertilizer normally expected in the fluid fertilizer industry with other sulfur sources.

A further procedure taught in the prior art, Boles ('546, supra) produces nitrogen-sulfur suspensions from by-product ammonium sulfate or sulfuric acid and ammonia with addition of other nitrogen fluids or solids containing urea and/or ammonium nitrate. However, because these products contain urea and/or ammonium nitrate, which are relatively high-priced fertilizer compounds compared with small-crystal ammonium sulfate, their economic advantage over other higher priced fertilizer sulfur sources such as elemental sulfur and ammonium thiosulfate solution is reduced. In addition, if appreciable proportions of urea and ammonium nitrate are not added, the product pH is too low, which precludes proper gelation of the suspending clay and results in rapid deterioration of the product's physical and storage properties.

In still a further procedure taught in the prior art, Boles ('561, supra) teaches a process for the production of concentrated high-grade, high-quality, long-storing suspensions containing appreciable AS solids directly from low cost impure AS slurries or crystals, by operation of a simple and economical process which can be either of the batch or continuous type, and in which process the addition of very small amounts of ammonia or another suitable base such as potassium hydroxide during production of said suspensions is utilized as a clay stabilizer in substitution for much larger amounts of higher priced compounds such as urea and/or ammonium nitrate, and wherein the resulting AS suspensions are, or can be, stored as intermediate feed stream materials and further, wherein is produced crystal-free, true solution NS fertilizers from such crystal-containing suspension intermediates and still further, wherein there is eliminated the need for large, elaborate, and costly crystallizer systems, which are normally operated for long periods of time for effecting sufficient size of crystal growth of the resulting AS crystals such that they will be large enough for satisfactory storage and use as solid fertilizer and even still further, wherein elimination of the need for the costly and difficult process steps which are normally required for production of AS crystals dry enough for satisfactory storage and use as solid fertilizer including the centrifuging of the AS slurry to effect separation of the crystals from the mother liquor as well as the final drying of such separated AS crystals.

In the practice of this most recent procedure taught in the prior art by Boles ('561, supra), there are produced AS suspension intermediates from low-quality by-product AS fines as a means for satisfactorily storing the AS fines and overcoming the problems usually associated with storage of the AS fines in dry form. Although improving the properties of AS via production of suspension intermediates was a substantial improvement and overcame many of the prior art problems, which otherwise would result from the severe caking with the AS fines in solid form, successful operation of processes to produce the AS suspension intermediates necessitated conversion of the AS fines to suspensions immediately or very soon after production of the AS fines and before severe caking thereof occurs. If these AS fines are not converted to suspension intermediates very soon after their production, the AS fines will have to be crushed or delumped to allow feeding of the material into mixing equipment for production of the suspension intermediates, thereby adding expensive steps to the process. In many instances, dealers prefer buying the AS fines during the off season when fertilizer production and distribution activities are lower, demand for AS fines are lower, and prices for the AS fines are lower. During such periods of low demand inventories of AS fines at producer sites are often very high, resulting in the AS fines generally being in the poorest condition, exhibiting severe caking, and in some cases virtual solidification into large AS boulders. If the AS fines are bought soon after their production such as during periods of high fertilizer activity, the material may be in better condition for successful production of suspension intermediates, but the supplies may be very limited and prices are generally higher because of the higher demand for the by-product AS fines. The fact that it is necessary for the AS fines not be caked and not contain large lumps for successful and efficient production of suspension intermediates introduces a serious limitation to this method of storing and using low-quality by-product AS fines in that it is necessary to obtain the AS fresh off the centrifuge or dryer and then to convert the AS to AS suspensions within a day or two after such AS fines are produced.

It will, of course, be appreciated that there is no suggestion in the teachings of any of the above-mentioned, prior-art references of the viable processes and/or techniques resulting from the practice of the instant invention for easily and consistently converting wet, low-quality, poor-physical-property, by-product AS fines into a dramatically improved, high-quality, free-flowing, and long-storing dry form of AS fines capable of being stored indefinitely at the AS producer site or at the fertilizer dealer site until needed for production of suspensions or for other uses and wherein the need for large crystallizers and drying of the AS fines shown in the prior art disclosed by Boles ('561, supra) is eliminated.

It will be further appreciated that the prior art does not teach a process for easily and consistently converting wet, low-quality, poor-physical-property, by-product AS fines into a dramatically improved, high-quality, free-flowing, and long-storing dry form of AS fines capable of being stored indefinitely at the AS producer site or at the fertilizer dealer site prior to production of the AS suspensions by modification of either the process taught in '561, supra, or the process taught in '546, supra.

SUMMARY OF THE INVENTION

The instant invention relates to novel techniques for dramatically improving prior-art methods and means for utilizing low-quality forms of by-product AS fines by converting dried or undried, low-quality, poor-physical-property, by-product AS fines into a dramatically improved, high-quality, free-flowing, and long-storing dry form of AS fines capable of being stored indefinitely at the AS producer site or at the fertilizer dealer site prior to production of suspensions or use in other applications wherein the need for large and relatively expensive fluid storage facilities for suspension intermediates of the type required in the practice of '561, supra, is eliminated.

Another important feature of the instant invention is that it provides improved means and methods over those in '561 and '546, supra, for utilizing a source of fertilizer sulfur in fluid forms, which are substantially less expensive than other commonly used and high-priced fluid fertilizer sulfur sources such as ammonium thiosulfate (ATS) solution and elemental sulfur suspensions.

The gist underlying effecting the concepts of the instant invention involves the elimination of the requirement that the poor-quality AS fines be converted into suspension intermediates immediately or soon after production and before they have a chance to cake or pack during subsequent storage or shipment. With practice of the instant invention, the resulting improved AS fines, produced by utilizing an unconventional technique of mixing the attapulgite gelling clay or the combination of attapulgite gelling clay and neutralizing agent directly to the AS fines, can be successfully stored in a free-flowing, non-caking state for long periods of time at the AS producer or fertilizer dealer site and then be converted easily into suspension intermediates, and perhaps more importantly, into suspension final products, or other products as desired at the convenience of the dealer or producer. This allows the dealer to store larger quantities of the AS fines in dry form, which is an inexpensive form of storage, and to have in inventory for processing operations smaller quantities of AS suspension intermediates, which is a more expensive and time and labor intensive form of storage than solids storage. This lowers the dealer's capital and labor costs for fluid storage for the AS suspension intermediates by allowing the dealer to substitute less expensive open-sided storage sheds instead of having to use far more expensive storage tanks for storage of all of the AS in suspension intermediate form. The dealer can simply make up the AS suspension intermediate from the improved, free-flowing AS fines in storage as it is needed in normal fertilizer blending operations, or because of the built-in flowability of the instant invention, use the improved dry AS fines in other applications for producing products as desired.

A particularly important feature involved in the practice of the instant invention is directing the attapulgite gelling clay feed stream or both the attapulgite gelling clay and the neutralizing agent (base) clay stabilizer feed streams of the AS suspension intermediate process of Boles ('561 supra) or the nitrogen-sulfur suspension process ('546, supra) away from the mix tank and instead introducing these feed streams directly to the low-quality by-product AS fines and mixing them intimately therein to produce a highly improved, free-flowing, non-caking, long-storing form of AS fines capable of being stored in dry form for long periods before use in production of AS suspension intermediates, production of suspension final products, production of other products, or application to the soil in existing form.

Another important feature of the instant invention is that addition of the attapulgite gelling clay directly to the AS fines does not add any raw material costs to the process wherein the resulting improved AS is used in production of suspensions because the attapulgite gelling clay present in such improved AS fines is recovered in producing suspension fertilizers by reducing or eliminating the quantity of clay that is normally used to produce such suspensions.

The effecting of the principal method or embodiment comprising the instant invention requires only a minimal amount of relatively inexpensive equipment, and is simply and easily placed into practice by setting into motion a solids mixing vessel such as a rotary drum, bulk solids blender, cement mixer, etc., and adding the low-quality by-product AS fines and the attapulgite gelling clay or the attapulgite gelling clay and neutralizing agent clay stabilizer of Boles ('561, supra), or other clay stabilizers, infra, while operating the solids mixing equipment so as to effect intimate mixing of the ingredients. Feeding and mixing of the ingredients in said mixer can take place on either a batch or a continuous basis. After a suitable batch time or retention time necessary to effect intimate mixing of said ingredients, the resulting improved AS fines, which are now free-flowing, non-caking, and long-storing, are then stored and/or shipped, converted to AS suspension intermediates and subsequently blended with other materials to produce suspension or solution final products, or blended directly with other materials to produce suspension final products. In addition, the improved, long-storing, flowable ammonium sulfate fines now have the added versatility to facilitate their use in a variety other applications not necessarily requiring a gelling clay, such as for use in granulation, direct application to the soil, blending with other materials to produce solid final products for direct application to the soil, or blending with other materials to produce solution products for direct application to the soil.

OBJECTS OF THE INVENTION

It is, therefore, the principal object of the present invention to develop new methods for dramatically improving the methods of the prior art and for more easily producing, storing, handling, and using a very inexpensive, low-quality form of by-product ammonium sulfate (AS), which by-product AS has very poor storage, handling, and use properties and is normally most unsuitable as a solid fertilizer because the crystals are too finely-sized and usually are too wet.

Another principal object of the present invention is to develop new methods for dramatically improving the methods for utilizing low-quality forms of by-product AS fines by first converting such AS fines into a dramatically improved, high-quality, non-caking, free-flowing, and long-storing dry form of AS fines capable of being stored as a dry material for indefinite periods of time at the AS producer site or at the AS user site prior to production of suspensions, wherein the need for large crystallizers and drying of the AS fines, as produced, is eliminated and also eliminated is the requirement for maintaining substantial fluid storage means to hold suspensions made under the requirements of Boles ('561, supra).

Still a further object of the present invention is to provide a usable source of fertilizer sulfur to the fertilizer industry which is of dramatically lower cost and, therefore, substantially more economical than other commonly available, commonly used and high-priced fertilizer sulfur sources, such as ammonium thiosulfate (ATS) solution and elemental sulfur suspensions.

A still further object of the present invention is to develop improved methods for elimination of the need for large, elaborate, and costly crystallizer systems in the by-product ammonium sulfate industry, which crystallizer systems are normally required for production of AS crystals large enough for satisfactory storage and use as fertilizer, and for elimination of the need for the costly and difficult process of drying of the resulting AS crystals which is normally required for production of AS crystals dry enough for satisfactory storage and use as solid fertilizer (see Reference Manual IFDC-R-1, supra), albeit, said drying step is not often practiced in the production of fine-crystal, coke-oven by-product ammonium sulfate.

Another object of the present invention relates to development of new methods and means to improve the compositions, means, and methods for the efficient production of high-grade, high-quality, long-storing suspension materials as taught by Boles ('561, supra).

Still another object of the present invention is to develop new methods and means for improving the production of highly concentrated nitrogen-sulfur solution fertilizers made from ammonium sulfate suspension intermediates taught by Boles ('561, supra).

A still a further object of the present invention relates to development of new methods and means to improve the compositions, means, and methods for the efficient production of high-grade, high-quality, long-storing nitrogen-sulfur suspension fertilizers as intermediates or final products, as taught by Boles ('546, supra).

Still further and more general objects and advantages of the present invention will appear from the more detailed description set forth below, it being understood, however, that this more detailed description is given by way of illustration and explanation only and not necessarily by way of limitation, since various changes therein maybe made by, those skilled in the art without departing from the true spirit and scope of the instant invention.

BRIEF DESCRIPTION OF THE DRAWING

The present invention, together with further objectives and advantages thereof, will be better understood from a consideration of the following description taken in connection with the accompanying drawing and examples in which the FIGURE is a flowsheet generally illustrating the principles of our new and novel processes for improving the utilization of low-cost by-product AS material as a sulfur source. Note: Although the description which follows is conveniently directed to a batch operation, those skilled in this art will readily appreciate that only a few simple adjustments are necessary to practice same on a batch-continuous or on a continuous basis.

Referring now more specifically to the FIGURE, ammonium sulfate solids are fed from any convenient source 1 through line 1a into solids mixer/blender 4. Although not shown in detail, mixer 4 can comprise a rotary drum, bulk solids blender, or other rotating, shaking, or vibrating vessel, preferably equipped with internal blades or flights to effect efficient and intimate mixing of the contents thereof, such equipment is common to the solids mixing/blending industry. Understandably, the objects of the instant invention are best met when such ammonium sulfate is a by-product material source from chemical processing operations including production of coke or caprolactam. After addition of said ammonium sulfate solids to mixer 4, agitation/-rotation/shaking or other movement of mixer 4 is commenced for the purpose of mixing the contents of mixer 4. After said mixing action has commenced in mixer 4, attapulgite gelling clay comprising generally from about 0.5 to about 10 weight percent of the total charge of said ammonium sulfate solids, is fed from a source not shown through line 2 into solids mixer 4. After, during, or before addition of said clay to mixer 4, a base material or neutralizing agent such as calcium oxide, calcium hydroxide, sodium hydroxide, potassium hydroxide, limestone, ammonia, ammonium carbonate, ammonium bicarbonate, sodium carbonate, sodium bicarbonate, or mixtures thereof, if needed or desired, as a clay stabilizer for low-pH (less than pH 5) ammonium sulfates and usually ranging from about 0.01 to about 5.0 weight percent of the total charge of said ammonium sulfate solids, is fed from a source not shown through line 3 into solids mixer 4. After a suitable mixing time to effect intimate mixing of the contents of mixer 4, said suitable mixing time usually ranging from about 1 minute to upwards of 1 hour, said mixing time depending greatly on the size, efficiency, configuration, speed, and other variables associated with mixer 4, the resulting improved, free-flowing, non-caking, long-storing AS fines are removed from mixer 4 by conveyor belt, elevator, screw conveyor or other convenient solids conveying equipment and fed through line 5 into solids storage facilities 6, such as a covered bin or bay, until needed for shipping, production of fluid fertilizers, granulation, bulk blending, or application to the soil. When said improved AS crystals are needed for fluid fertilizer operations, water for dilution and for providing fluidity to a later mentioned suspension, and ranging in amounts up to about 50 weight percent of the total material charge and preferably in the range of from about 20 to 35% by weight along with said base or neutralizing materials, if needed for said low-pH ammonium sulfates and if not already added to said ammonium sulfate solids in mixer 4, usually ranging from about 0.01 to about 5.0 weight percent of the total material charge, are fed from sources not shown through line 8 and line 9, respectively, into first mixing means 10. Although not shown, first mixing means 10, or more simply, mix tank 10 is equipped with stirrer means (not shown) and/or recirculation pump (not shown). After introduction of said water and said base materials or neutralizing agents into first mixing means 10, agitation an/or recirculation is started. After said agitation and/or said recirculation is commenced, a predetermined amount of said improved AS fines, for formulation, is fed from solids storage facilities 6 with solids conveying equipment generally illustrated as line 7 into first mixing means 10. After addition of said improved AS fines is complete, said agitation and recirculation is continued for a period of time ranging from a few minutes upwards of half an hour, but preferably from about 5 minutes to about 20 minutes and most preferably about 10 minutes. The resulting intermediate suspension product(s) are then removed from tank 10 and pumped to and introduced into storage tank 12 through line 11. When said suspension intermediates are needed for fertilizer operations, water of formulation is first fed, from a source not shown, to second mixing means 16, or more simply mixer 16, through line 14. Although not shown, mixer 16 is equipped with an agitator and/or recirculation pump. After addition of said water to second mixing means 16 is complete, agitation and/or recirculation is started. After said recirculation and/or agitation is started, said suspension intermediate in storage tank 12 is pumped through line 13 into mix tank 16 and agitation and recirculation in mix tank 16 is continued for a short period of time, usually about 1 to about 5 minutes after which time various other fertilizer fluids or solids in amounts necessary for obtaining the desired formulation are fed through line 15 into mixer 16 with further continued agitation and recirculation maintained therein for a short period of time, usually about from 1 to 5 minutes, which results in production of the final crystal-free solution product(s) which are at that time removed from second mixing means 16 via line 17 either to short-term, usually less than a few days, storage or directly to application equipment generally shown at 18.

As an alternative to production of the said crystal-free solution products, referring again now more specifically to the FIGURE, water, if needed for formulation is first fed, from a source not shown, to third mixing means 23, or more simply, mixer 23, through line 20. Although not shown, mixer 23 is equipped with an agitator and/or recirculation pump. After addition of said water to mixer 23 is complete, agitation and/or recirculation is started. After said agitation and/or recirculation is started, suspending or gelling clay of the type including attapulgite, sepiolite, bentonite, montmorillanite, or other commercially used suspending or gel-forming clays or agents, and mixtures thereof, if needed for formulation and to obtain the desired physical properties and gel strength in the later mentioned final suspension product, is fed from a source not shown through line 22 to mixer 23, and agitation and recirculation is continued for a short period of time, usually from about 1 to about 10 minutes, but most preferably for about 5 minutes. When said agitation and/or recirculation of said clay is complete, a predetermined amount of said AS suspension intermediate from storage tank 12 is pumped through line 12a into mixer 23 and agitation and recirculation in mixer 23 is continued for a short period of time, usually about 1 to about 5 minutes, after which time various other fertilizer fluids and/or solids or other materials are fed through 21 into mixer 23 with further continued agitation and recirculation maintained therein for a short period of time, usually from about 1 to 5 minutes, which results in production of the final suspension product(s), either nitrogen-sulfur suspensions as taught in Boles ('546 supra) or multicomponent suspensions, which are at that time removed from mixer 23 via line 24 either to short-term, usually less than a few days, storage, or directly to application equipment generally shown at 25.

As an alternative to production of said AS suspension intermediates and subsequent production of said final crystal-free solution products or said suspension final products, referring again now more specifically to the FIGURE, water, if needed for formulation is first fed, from a source not shown, to third mixing means 23, or more simply, mixer 23, through line 20. Although not shown, mixer 23 is equipped with an agitator and/or recirculation pump. After addition of said water to mixer 23 is complete, agitation and/or recirculation is started. After said recirculation and/or agitation is started, suspending or gelling clay of the type including attapulgite, sepiolite, montmorillanite, or other commercially used gel-forming clays, and mixtures thereof, if needed for formulation and to obtain the desired physical properties and gel strength in the later mentioned final suspension product, is fed from a source not shown through line 22 to mixer 23, and agitation and recirculation is continued for a short period of time, usually from about 1 to about 10 minutes, but most preferably for about 5 minutes. When said agitation and/or recirculation of said clay is complete, a predetermined amount of said improved AS fines from solids storage facilities 6 is fed by said convenient solids conveying equipment through line 19 into mixer 23 and agitation and recirculation in mixer 23 is continued for a short period of time, usually about 1 to about 5 minutes, after which time various other fertilizer fluids and/or solids are fed through line 21 into mixer 23 with further continued agitation and recirculation maintained therein for a short period of time, usually about from 1 to 5 minutes, which results in production of the final suspension product(s), either nitrogen-sulfur suspensions as taught in Boles ('546 supra) or multicomponent suspensions, which are at that time removed from mixer 23 via line 24 either to short-term, usually less than a few days, storage or directly to application equipment generally shown at 25.

As alternatives to production of either the said final crystal-free solution or said final suspension products, said improved AS fines from solids storage facilities 6 may be fed by any of many convenient solids conveying equipment (not shown) through line 19 and then through line 26 to shipping equipment, generally shown at 27; through line 28 to granulating equipment, generally shown at 29; through line 30 to solids bulk blending equipment, generally shown at 31; or through line 32 to solid fertilizer application equipment, generally shown at 33.

Of course, it will be appreciated that in still other embodiments of the instant invention, the said improved AS fines, said ammonium sulfate suspension intermediates, said crystal-free solution final products, or said suspension final products can also be produced on a batch-continuous or a continuous production basis with the equipment described in the above embodiments whereby the feed materials are fed simultaneously on a batch-continuous or a continuous basis.

DESCRIPTION OF THE PREFERRED EMBODIMENTS

In carrying out the objects of the present invention in one form thereof, means and methods have been developed which are eminently suitable for improving the existing means and methods for utilizing the aforementioned low-quality, low-priced by-product ammonium sulfate. AS noted above, it is endowed, as received with very poor storage, shipping, handling, use, and application characteristics and is most unsuitable for either direct application or bulk blending with other solid fertilizer materials. In practice of this invention, a highly storage-stable, free-flowing, non-caking form of dry AS crystals is produced with subsequent storing of such improved AS until it is needed, wherefrom (1) multicomponent suspension fertilizers are produced very simply and economically by addition of water or water and suspending or gelling agents, if such agent is needed for formulation and desired final product physical properties and gel strength, and other common fertilizer fluids and/or solids such as solution-grade potassium chloride, ammonium phosphate suspensions or solutions, and urea-ammonium nitrate solutions, (2) nitrogen-sulfur suspension fertilizers are produced as taught by Boles ('546, supra), or (3) the highly storage-stable, high-concentration AS suspension intermediates are produced and stored until needed as taught by Boles ('561, supra), wherefrom either crystal-free solution final products are produced as taught by Boles ('561, supra) or suspension final products are produced. Incidental to the practice of this invention, the said highly storage-stable, free-flowing, non-caking, form of dry AS crystals can also be used to produce granulated or bulk blended solid fertilizers with equipment and methods common to the industry, or the said improved AS crystals can be shipped to other locations for other uses or applied in existing form to the soil.

In practicing the instant invention in the batch-operation mode, suitable solids mixing equipment, such as a solids bulk blender or rotating drum type mixer, is first charged with a predetermined amount of said low-quality by-product ammonium sulfate and the said solids mixing equipment set into motion to effect the mixing action for which the mixing equipment is intended. Next, with continued mixing action, attapulgite gelling clay is added to the operating solids mixing equipment. After, during, or before addition of said clay, a base material or neutralizing agent such as calcium oxide, calcium hydroxide, sodium hydroxide, potassium hydroxide, limestone, ammonia, ammonium carbonate, ammonium bicarbonate, sodium carbonate, sodium bicarbonate, or mixtures thereof, if needed or desired, as a clay stabilizer in the case of low-pH (less than pH 5) ammonium sulfates, are added to the operating solids mixing equipment. When addition of all feeds to the solids mixer is complete, operation of the solids mixer is continued for a suitable mixing time sufficient to effect intimate mixing of the contents of the solids mixer. The period of time for the purposes of intimate mixing of the contents of the solids mixer can preferably range from about 1 minutes to upwards of 1 hour, and depends greatly on the size, efficiency, configuration, speed, and other variables associated with the solids mixing equipment. The resulting improved, free-flowing, non-caking, long-storing AS crystals are then removed from the solids mixer by conveyor belt, elevator, screw conveyor or other convenient solids conveying equipment and transported to storage facilities, such as a covered bin or bay, until needed for shipping, production of fluid fertilizers, granulation, bulk blending, or for application to the soil.

In using the improved AS crystals for direct production of multicomponent suspension final products or in production of nitrogen-sulfur suspension products taught by Boles ('546, supra), a suitable mixer is first charged with the water of formulation, if needed, and/or part or all of the other formulated fluids, and then recirculation and agitation are commenced. Next, a suitable suspending gelling agent, if needed for formulation and to obtain the desired physical properties and gel strength in the suspension final product, is added and agitation and/or recirculation is continued for a short period of time, usually from about 1 to about 10 minutes, but most preferably for about 5 minutes. When agitation and/or recirculation of the clay is complete, the improved AS crystals are added with continued agitation and/or recirculation, after which various other fertilizer fluids and/or solids are added with further continued agitation and recirculation for a short period of time, usually from about 1 to 5 minutes, which results in production of the final suspension product(s) which are then removed from the mixer to either storage or directly to application equipment.

In using the improved AS crystals for direct production of crystal-free multicomponent solution final products or for production or the crystal-free solution final products of Boles ('561, supra), a suitable mixer is first charged with the water of formulation and then recirculation and agitation are commenced. Next, the improved AS crystals are added with continued agitation and/or recirculation for 1 to 5 minutes to dissolve all or part of the AS crystals, after which various other fertilizer fluids and/or solids are added with further continued agitation and/or recirculation for a short period of time, usually from about 1 to 5 minutes, which results in production of the final crystal-free solution product(s) which are then removed from the mixer to either storage or directly to application equipment.

In using the improved AS crystals for production of the suspension intermediates of Boles ('561, supra), a suitable mixer is first charged with the water of formulation and then, if the base material(s) was not added in the previous step of production of the improved AS crystals and if needed to effect a near-neutral pH in the said suspension intermediate, with small amounts of a suitable base material or neutralizing agent such as calcium oxide, calcium hydroxide, sodium hydroxide, potassium hydroxide, limestone, ammonia, ammonium hydroxide, ammonium carbonate, ammonium bicarbonate, sodium carbonate, or sodium bicarbonate. Agitation and recirculation of the resulting mixture is commenced and the improved AS crystals are then added to the mixing vessel with continued agitation and/or recirculation for a few minutes to gel the clay and produce the finished suspension intermediate. The period of time for the purposes of gelling can preferably range from about 5 minutes to about 20 minutes. The suspension intermediates can then be stored and used when needed to produce multicomponent suspension final products, the nitrogen-sulfur suspension products taught by Boles ('546, supra), or the crystal-free solution final products taught by Boles ('561, supra).

In using the said AS suspension intermediates produced via said improved AS crystals to produce said multicomponent suspension final products or to produce the nitrogen-sulfur suspensions of Boles ('546, supra), a suitable mixer is first charged with the water of formulation, if needed, and/or part or all of the other formulated fluids, and then recirculation and agitation are commenced. Next, a suitable suspending or gelling agent, if needed for formulation and to obtain the desired physical properties and gel strength in the suspension final product, is added and agitation and/or recirculation is continued for a short period of time, usually from about 1 to about 10 minutes, but most preferably for about 5 minutes. When agitation and/or recirculation of the clay is complete, the AS suspension intermediate is added with continued agitation and/or recirculation, after which various other fertilizer fluids and/or solids are added with further continued agitation and recirculation for a short period of time, usually from about 1 to 5 minutes, which results in production of the final suspension product(s) which are then removed from the mixer to either storage or directly to application equipment.

As alternatives incidental to the present invention, the improved AS crystals may be fed to granulation equipment for production of granular AS or multicomponent solid fertilizers, solids bulk blending equipment for production of multicomponent solid fertilizers, or to solid fertilizer application equipment for application to the soil in existing form.

Advantages realized by practicing the teachings of the instant invention are that it provides a dramatically improved means for successfully and economically storing and using a very inexpensive, low-quality form of by-product ammonium sulfate which normally has very poor storage and handling properties and is normally most unsuitable for storage and use as a solid because the crystals are too small and often too wet. Further advantages of the instant invention will become apparent hereinafter.

As used herein, the term "attapulgite clays" refers to and means hydrated aluminum-magnesium silicate compounds, the chief ingredients of Fuller's earth. As used herein, the term "attapulgite gelling clay" refers to and means a specific group of commercially available and appropriately labeled attapulgite clays which have been processed so as to possess properties capable of forming gels in liquid systems and capable of suspending nonhomogeneous phases within the liquid system to form systems known as a suspensions; the attapulgite gelling clays differ in properties from other types of attapulgite clays, which are commonly used in drilling fluids, for decolorizing oils, and as filter mediums. The attapulgite gelling clays are processed and manufactured specifically for use in production of gels and suspensions in liquid systems and would not be expected to be used or selected for use as anticaking agents, especially in view of their gel forming behavior when exposed to aqueous media.

As used herein the term "suspension fertilizer" means and encompasses a fluid fertilizer generally containing nutrients in solution and in finely divided particulate form with such particulates being held suspended homogeneously therein by a gelling agent.

EXAMPLES

In order that those skilled in the art may better understand how the present invention may be practiced for dramatically improving successful production and use of the low-quality, low-cost, small-crystal variety of by-product AS which normally is unsuitable for storage and use as a solid fertilizer because of the occurrence of severe caking thereof which in turn results in poor flowability, the following examples are given by way of illustration only and not necessarily by way of limitation. Examples I–X taught in Boles ('561, supra) compliment the following examples, which are presented as an addition to and to show improvement in the art demonstrated therein.

Example I

In the pursuit of further information for the purpose of more clearly defining the parameters affecting the practice of the instant invention, the investigations herein reported were made to demonstrate successful procedures for dramatically improving the storage quality and after-storage flowability of low,quality ammonium sulfate crystals obtained as a by-product of coke production by scrubbing coke gases with sulfuric acid to remove ammonia. The following example shows the effect of moisture content on the relative flowability of the by-product ammonium sulfate, represented by the angle of repose (AOR) of the by-product AS, and the effect of various attapulgite gelling clays on the AOR, or relative flowability, of the by-product ammonium sulfate. The angle of repose is the angle between a horizontal surface and the side of the pile made when the by-product ammonium sulfate is poured onto the horizontal surface. Accordingly, it should be appreciated that there exists an inverse and proportional relationship between AOR and the flowability of the material represented thereby. By-product ammonium sulfate crystals from coke production which have been dried and/or otherwise specially treated to be characterized with angles of repose ranging from about 35 to about 40 degrees generally exhibit free-flowing characteristics and are generally dry in appearance, whereas by-product ammonium sulfates from coke production with angles of repose greater than about 40 degrees generally exhibit dampness and decreasing flowability with increasing angle of repose. For example, an ammonium sulfate with AOR of 43 degrees exhibits slight dampness but nevertheless exhibits moderate flowability, whereas ammonium sulfates with AOR's of 50–60 degrees generally have the appearance of wet sand and generally exhibit poor flowability. A coke-oven by-product ammonium sulfate with AOR of 35 degrees or less generally has the appearance of dry sand and generally exhibits excellent flowability.

TABLE IA

EFFECT OF MOISTURE ON FLOWABILITY OF BY-PRODUCT AMMONIUM SULFATE[2]

| Sample | Additive(s) | Moisture Content, wt % H$_2$O | Angle of Repose, degrees |
|---|---|---|---|
| Ammonium Sulfate A | | | |
| AS-1 | None | 0.00 | 37 |
| AS-2 | None | 0.06 | 41 |
| AS-3 | None | 0.18 | 43 |
| AS-4 | None | 0.57 | 55 |

TABLE IA-continued

EFFECT OF MOISTURE ON FLOWABILITY OF BY-PRODUCT AMMONIUM SULFATE[2]

| Sample | Additive(s) | Moisture Content, wt % H$_2$O | Angle of Repose, degrees |
|---|---|---|---|
| AS-5 | None | 1.19 | 60 |
| Ammonium Sulfate B | | | |
| AS-6 | None | 0.59 | 51 |
| AS-7 | None | 0.81 | 55 |
| AS-8 | None | 1.22 | 58 |
| Ammonium Sulfate C | | | |
| AS-9 | None | 0.62 | 58 |
| AS-11 | None | 1.64 | 56 |

[a]Crystal size distributions for "Ammonium Sulfate A" and "Ammonium Sulfate B" are shown in Table IB. Crystal size distribution for "Ammonium Sulfate C" not available, but similar to "Ammonium Sulfate B."

TABLE IB

SCREEN ANALYSES OF "AMMONIUM SULFATE A" AND "AMMONIUM SULFATE B" FROM TABLE IA

| Crystal Size | | Wt. % Crystals Retained on Screens | | Cumulative Wt. % Retained on Screens | |
|---|---|---|---|---|---|
| Tyler mesh | Micrometers | A | B | A | B |
| +8 | >2360 | 0.4 | 0.2 | 0.4 | 0.2 |
| −8 +10 | 1700–2360 | 0.4 | 0.2 | 0.8 | 0.4 |
| −10 +16 | 1000–1700 | 2.4 | 13.0 | 3.2 | 13.4 |
| −16 +20 | 850–1000 | 1.6 | 14.8 | 4.8 | 28.2 |
| −20 +28 | 600–850 | 10.0 | 37.4 | 14.8 | 65.6 |
| −28 +35 | 420–600 | 55.8 | 18.0 | 70.6 | 83.6 |
| −35 +48 | 300–420 | 28.8 | 12.0 | 99.4 | 95.6 |
| −48 +65 | 210–300 | 0.6 | 3.4 | 100.0 | 99.0 |
| −65 +100 | 150–210 | 0.0 | 0.8 | | 99.8 |
| −100 | <150 | 0.0 | 0.2 | | 100.0 |

TABLE II

EFFECT OF ADDITIVES ON FLOWABILITY OF BY-PRODUCT AMMONIUM SULFATE[a]

| Sample | Additive(s) | Additive Content, wt % | Angle of Repose, degrees |
|---|---|---|---|
| AS-5 | Attapulgite clay (Min-U-Gel 200) | 0.0 | 60 |
| | | 2.0 | 53 |
| | | 4.0 | 45 |
| | | 6.0 | 37 |
| | | 8.0 | 35 |
| AS-9 | Attapulgite clay (Min-U-Gel 200) | 0.0 | 58 |
| | | 2.0 | 55 |
| | | 4.0 | 43 |
| | | 6.0 | 38 |
| | | 8.0 | 38 |
| | | 10.0 | 39 |
| AS-4 | Attapulgite clay (Min-U-Gel 200) | 0.0 | 55 |
| | | 4.0 | 54 |
| | | 6.0 | 41 |
| | | 8.0 | 39 |
| AS-2 | Attapulgite clay (Min-U-Gel 200) | 0.0 | 41 |
| | | 2.0 | 43 |
| | | 4.0 | 35 |
| | | 6.0 | 39 |
| | | 8.0 | 37 |
| | | 10.0 | 34 |
| AS-1 | Attapulgite clay (Min-U-Gel 200) | 0.0 | 37 |
| | | 2.0 | 38 |
| | | 4.0 | 35 |
| | | 6.0 | 35 |
| | | 8.0 | 33 |
| AS-11 | Attapulgite Clay (Min-U-Gel 200) | 0.0 | 56 |
| | | 2.0 | 49 |
| | | 4.0 | 41 |
| AS-11 | Attapulgite Clay (Attagel 350) | 0.0 | 56 |
| | | 2.0 | 44 |
| | | 4.0 | 41 |

TABLE II-continued

EFFECT OF ADDITIVES ON FLOWABILITY OF BY-PRODUCT AMMONIUM SULFATE[a]

| Sample | Additive(s) | Additive Content, wt % | Angle of Repose, degrees |
|---|---|---|---|
| | | 5.0 | 36 |

[a]See Table I for sample definitions.

Example II

In the pursuit of still further information for the purpose of more clearly defining the parameters affecting the practice of the instant invention, the investigations herein reported were made to demonstrate successful procedures for dramatically improving the flowability and storage properties of low-quality ammonium sulfate crystals obtained as a by-product of coke production by scrubbing coke gases with sulfuric acid to remove ammonia. The following example shows the effect of addition of attapulgite gelling clays or attapulgite gelling clays and calcium oxide on the relative flowability of the by-product ammonium sulfate initially upon addition of the gelling clays or gelling clays and calcium oxide as well as after storage of the AS/clay mixtures for 6 months under roof but exposed to atmospheric humidity. The samples of by-product AS containing gelling clays or gelling clays and calcium oxide were stored in approximately 50-pound quantities in 5-gallon buckets from December of 1991 through June of 1992 to allow the samples to be exposed to high-humidity and wet conditions followed by drying conditions, as are encountered during conventional storage of solid fertilizers. The by-product AS Used in this example ("Ammonium Sulfate A," Tables IA and IB) was produced at a coke plant near Birmingham, Ala. and contained 0.2% moisture initially when shipped. The gelling clays or gelling clays and calcium oxide were mixed with the by-product AS in an electric cement mixer by simply charging the mixer with the AS and additive(s), starting rotation of the cement mixer, and continuing rotation for 5–10 minutes to ensure intimate mixing of the contents of the mixer. After mixing was complete, each sample was measured for angle of repose and pH of a saturated solution with water. The samples were then placed in open 5-gallon buckets and stored for 6 months, after which the samples were assessed and measured for presence of a crust, depth and hardness of the crust, flowability (visual appearance and AOR) of the material underneath the crust, and extent of caking.

After the 6-month storage period, the AS samples containing the additives shown in Table III, below, generally had thin crusts of ½ to 1-inch in thickness on the surface of the sample, with the crust hardness varying from very soft and crumbly to very hard. Surprisingly, the material underneath the crusts in the AS additive(s) samples was generally as free flowing as dry sand, apparently protected by the crusts. However, the blank AS sample containing no additives exhibited caking throughout the entire volume and depth of the sample as did a 25-ton, 6-foot-high pile of the same AS containing no additives. In addition, the AOR's of the AS additive(s) samples indicates good flowability, whereas, the AOR of the blank AS sample containing no additives indicated poor flowability.

TABLE III

EFFECT OF ADDITIVES ON STORAGE OF BY-PRODUCT AMMONIUM SULFATE

| Additive(s) | pH, Initial | pH, 6 mos. | AOR, degrees, Initial | AOR, degrees 6 mos. | Sample description after 6 months |
|---|---|---|---|---|---|
| None | 3.8 | 3.1 | 43 | 49 | 1.5–2" hard crust, medium to soft lumps underneath throughout depth |
| 4% Min-U-Gel 200 Clay | 4.4 | 4.5 | 35 | 35 | 0.5" hard crust, 0.25" soft crust, flowable underneath |
| 4% Min-U-Gel 200 Clay + 0.15% CaO | 8 | 7.1 | — | 33 | 1.0" medium hard crust, flowable underneath |
| 5% Attagel 350 Clay | 5.3 | 6.4 | 36 | 34 | 0.5" hard crust, flowable underneath |
| 5% Attagel 350 Clay + 0.15% CaO | 8.2 | 7.3 | — | 35 | 0.5" hard crust, flowable underneath |

Example III

The results from tests comprising the following example show the effects of the gelling clay stabilizer, calcium oxide in this case, and the type of attapulgite gelling clay used for dry storage improvement on the gelling time and viscosity of fluid fertilizers produced from the AS/additive mixtures.

In this example, AS suspension intermediates of grade 14-0-0-16S, 2.8% clay were produced in 1000-gram quantities in a Waring blender from each of the AS/additive mixtures stored for 6 months in Example II, supra. In some cases, a small amount of ammonium hydroxide solution, if needed for neutralizing free sulfuric acid and obtaining a near neutral pH in the suspension, was added in production of the suspension intermediates to thus enhance gelation efficiency during production and stabilize the attapulgite gelling clay after production and during storage. If the pH is too low, more attapulgite gelling clay is required, longer gelling times are required, and the clay rapidly looses its gelling properties during storage and settling of the AS solids occurs. For AS/attapulgite gelling clay mixtures, no additional gelling clay was added in the formulation in production of the AS suspensions; all of the gelling clay present in the AS suspensions was supplied by the gelling clay added to the low-quality by-product AS before the 6-month storage period described in Example II, supra. For the AS containing no additive, 2.8% Min-U-Gel 200 attapulgite gelling clay was added in the formulation of the AS suspension intermediate.

In cases where the AS is destined for production of suspension fertilizers, addition of gelling clays to the AS as anticaking agents would not add any raw material costs and in many cases would not add an extra process step because the gelling clay added to the AS could be credited into the formulation of the suspension fertilizer and the clay addition step during production of the suspension could often be eliminated. Furthermore, the performance of AS/gelling clay mixtures in production of fluid fertilizers is predictable, whereas, use of other additives in the AS has been shown to have an unpredictable effect on product viscosity or other physical properties.

In addition, the results in Table IV, below, indicate that if the AS/clay mixture is destined for production of an AS suspension intermediate for storage and later use and the AS as produced has low pH, a gelling clay stabilizer-neutralizing agent, here for example calcium oxide, should be added to the AS/gelling clay mixture during or shortly after addition of the gelling clay and before storage to protect the gelling properties of the clay from being damaged by the acidity of the AS. When addition of a clay stabilizer is deferred until production of the AS suspension intermediate, in which case ammonia would normally be used, rather than adding the clay stabilizer to the dry AS/clay mixture, the result is a decrease in the gel strength potential of the clay contained in the AS/clay mixture, due to damage to the clay by the free sulfuric acid contained on the by-product AS, which is typical of by-product ammonium sulfates from both the coke and caprolactam industries. The data in Table IV, below, also show that lack of a neutralizing agent/clay stabilizer in the AS/attapulgite clay mixtures during storage resulted in diminished or unsatisfactorily low viscosities and gel strengths in the AS suspensions, due to the damage inflicted on the gelling clays during storage by the free sulfuric acid present on the by-product AS crystals. In the case of Attagel 350, damage was less severe due to the fact that this clay contains components which result in a higher pH in the AS/Attagel 350 mixture, apparently neutralizing more of the free acid on the AS crystals and thereby reducing clay damage during dry storage. However, results nevertheless show an increase in gelation potential when calcium oxide was added as a clay stabilizer before storage of the AS/Attagel 350 mixture. In the case of the Min-U-Gel 200 attapulgite clay, its capacity to neutralize free acid on the AS crystals appears to be very low and, therefore, addition of a clay stabilizer before long-term storage is preferred. For short storage periods, deferring addition of the clay stabilizer until production of the suspension intermediate is an option, but there is no apparent advantage in doing so, and most often there is a disadvantage in that more gelling clay is required or longer gelling times are required if producing the AS suspension intermediate.

TABLE IV

EFFECT OF ADDITIVE TYPE ON PROPERTIES OF FLUID FERTILIZERS PRODUCED FROM IMPROVED BY-PRODUCT AMMONIUM SULFATE

| Additive(s) | NH₄OH used? | pH, before NH₄OH | pH, after NH₄OH | Agitation time, seconds | Viscosity (cP) of AS suspension |
|---|---|---|---|---|---|
| None | yes | 3.1 | 6.6 | 30 | 1,290 |
| 4% Min-U-Gel 200 Clay | yes | 4.5 | 6.3 | 30 | 230 |
| | | | | 60 | 440 |
| | | | | 120 | 810 |
| | | | | 150 | 900 |
| | | | | 180 | 1,000 |
| | | | | 240 | 1,060 |
| 4% Min-U-Gel 200 Clay + 0.15% CaO | no | 7.1 | — | 60 | 1,250 |
| 5% Attagel 350 Clay | no | 6.4 | — | 30 | 450 |
| | | | | 60 | 920 |
| | | | | 90 | 1,230 |
| 5% Attagel 350 Clay + 0.15% CaO | no | 7.3 | — | 30 | 780 |
| | | | | 60 | 1,440 |

INVENTION PARAMETERS

After sifting and winnowing through the data, supra, as well as other results and operations of my new, novel, and improved technique, including methods and means for the effecting thereof, the operating variables, including the acceptable and preferred conditions for carrying out my invention are summarized in Tables V and VI below:

TABLE V

AMMONIUM SULFATE/CLAY MIXER OPERATING CONDITIONS

| Variables | Operating Limits | Preferred Limits | Most Preferred Limits |
|---|---|---|---|
| Temperature, °C. | −50 to 200 | −45 to 190 | −40 to 180 |
| Mixing Speed[a] | a | a | a |
| pH | 1 to 10 | 1.5 to 9 | 2 to 8 |
| Clay Stabilizer, wt % | 0.01 to 5 | 0.01 to 3 | 0.01 to 2 |
| Attapulgite Gelling Clay, wt % | 0.5 to 10 | 0.5 to 9 | 0.5 to 8 |
| AS Moisture, wt % | 0.01 to 3 | 0.01 to 2 | 0.01 to 1 |
| Mixing Time[b], min | 0.1 to 360[b] | 0.5 to 180[b] | 1 to 60[b] |

[a]Mixing speed units and ranges depend on the type of mixer used. Operating limits would consist of the normal operating range for the specific type of solids mixing equipment chosen for mixing the additives with the AS.
[b]Mixing time depends on the type of mixer used. Operating limits would consist of the normal operating range for the specific type of solids mixing equipment chosen for mixing the additives with the AS.

TABLE VI

SUSPENSION MIXER OPERATING CONDITIONS FOR BY-PRODUCT AMMONIUM SULFATE/CLAY MIXTURES

| Variables | Operating Limits | Preferred Limits | Most Preferred Limits |
|---|---|---|---|
| Temperature, °C. | −40 to 125 | −30 to 100 | −20 to 75 |
| Mixing Speed, rpm | 1 to 500 | 10 to 400 | 20 to 300 |
| pH | 4 to 10 | 5 to 9 | 6 to 8 |
| Clay Stabilizer, wt % | 0.01 to 5 | 0.01 to 3 | 0.01 to 2 |
| Gelling Clay, wt % | 0.1 to 8 | 0.5 to 6 | 1 to 4 |
| Mixing Time, min | 1 to 60 | 2 to 40 | 3 to 20 |

OPERATING CONSIDERATIONS

The operating variables, including the acceptable and preferred conditions for carrying out use of the improved AS in production of AS suspension intermediates and subsequent production of crystal-free solution final products or in the direct production of nitrogen-sulfur suspension intermediates or final products are the same as taught in Boles ('561 and '546, supra).

FEED/RAW MATERIAL CONSIDERATIONS

The feed and raw material considerations are the same as those described for by-product ammonium sulfate crystals as taught in Boles ('561 supra); in addition to these considerations, it will be appreciated that by-product ammonium sulfate fines, even after substantial drying, contain some traces of moisture due to absorption of atmospheric moisture by the said ammonium sulfate. Therefore, even though chemical analyses may indicate 0% moisture due to the limitations of analyzing equipment, by-product ammonium sulfate exposed to the atmosphere, even after drying, will contain traces of moisture, possibly less than the said lower limit of 0.01%, although undetectable with common moisture analyzing equipment.

While I have shown and described particular embodiments of my invention, modifications and variations thereof will occur to those skilled in the art. I wish it to be understood, therefore, that the appended claims are intended to cover such modifications and variations which are within the true spirit and scope of my invention.

What I claim as new and desire to secure by Letters Patent of the United States is:

1. A process for improving the long-term storage, flowability, shipping, handling, and application properties of by-product ammonium sulfate crystals, which process comprises the following steps:
   (a) introducing into mixing means for intimately mixing solid materials, amounts of ammonium sulfate solids and amounts of attapulgite gelling clay, said ammonium sulfate solids containing from about 0.01 percent to about 3 percent by weight moisture and comprising crystals of ammonium sulfate ranging in length from about 100 to about 2000 microns, said amount of ammonium sulfate solids predetermined relative to said amounts of attapulgite gelling clay to provide in said mixing means a later mentioned substantially improved dry ammonium sulfate having an angle of repose ranging between about 30 to about 45 degrees and said attapulgite gelling clay ranging from about 0.5 to about 10 percent by weight of said improved ammonium sulfate, wherein said angle of repose is inversely proportional to the concentration of the attapulgite gelling clay in said ammonium sulfate, inversely proportional to the crystal size of the said ammonium sulfate, and directly proportional to the moisture content of the said ammonium sulfate; and
   (b) withdrawing said substantially improved dry ammonium sulfate from said mixing means as product.

2. The process of claim 1, wherein at least a portion of said substantially improved ammonium sulfate product is:
   (a) introduced into second mixing means together with aqueous media, solids required for suspension formulation; and
   (b) withdrawn from said second mixing means as the principal solid phase constituent, a resulting fluid suspension product.

3. (Amended) The process of claim 1, wherein the improved ammonium sulfate withdrawn in step (b) thereof has an angle of repose ranging from about 35 to about 45 degrees.

4. The process of claim 2, wherein the portion of improved ammonium sulfate introduced into step (a) thereof has an angle of repose ranging from about 35 to about 45 degrees.

5. The process of claim 1, wherein said improved ammonium sulfate withdrawn in step (b) thereof has an angle of repose of about 35 degrees.

6. The process of claim 2, wherein said improved ammonium sulfate introduced into step (a) thereof has an angle of repose of about 35 degrees.

7. The process of claim 1, wherein the portion of attapulgite gelling clay introduced into step (a) thereof relative to the amount of improved ammonium sulfate produced in step (b) thereof ranges from about 0.5 percent to about 9 percent by weight.

8. The process of claim 1, wherein the portion of attapulgite gelling clay introduced into step (a) thereof relative to the amount of improved ammonium sulfate produced in step (b) thereof ranges from about 0.5 percent to about 8 percent by weight.

* * * * *